United States Patent [19]

Harel et al.

[11] Patent Number: 5,740,456
[45] Date of Patent: Apr. 14, 1998

[54] METHODS AND SYSTEM FOR CONTROLLING INTERCHARACTER SPACING AS FONT SIZE AND RESOLUTION OF OUTPUT DEVICE VARY

[75] Inventors: Dov Harel, Bellevue; Martin P. Tompa, Woodinville; Eliyezer Kohen, Mercer Island, all of Wash.

[73] Assignee: Microsoft Corporation, Redmond, Wash.

[21] Appl. No.: 626,826

[22] Filed: Apr. 3, 1996

Related U.S. Application Data

[62] Division of Ser. No. 311,962, Sep. 26, 1994, Pat. No. 5,598,520.

[51] Int. Cl.$^6$ ........................................... G06F 3/14
[52] U.S. Cl. ........................ 395/780; 395/169; 395/172
[58] Field of Search .................................. 395/144, 148, 395/150, 151, 102, 780, 781, 783, 167, 168, 169, 172, 947, 948; 382/301; 345/141, 143

[56] References Cited

U.S. PATENT DOCUMENTS

| | | | |
|---|---|---|---|
| 4,591,999 | 5/1986 | Logan | 395/150 |
| 4,907,282 | 3/1990 | Daly et al. | 382/242 |
| 5,027,304 | 6/1991 | Jeng et al. | 395/150 |
| 5,050,103 | 9/1991 | Schiller et al. | 395/150 |
| 5,099,435 | 3/1992 | Collins et al. | 395/150 |
| 5,212,770 | 5/1993 | Smith et al. | 395/155 |
| 5,221,921 | 6/1993 | Statt | 345/143 |
| 5,295,240 | 3/1994 | Kajimoto | 395/172 |
| 5,301,267 | 4/1994 | Hassett et al. | 395/150 |
| 5,319,358 | 6/1994 | Martinez et al. | 345/141 |
| 5,355,449 | 10/1994 | Lung et al. | 395/150 |
| 5,399,029 | 3/1995 | Muraoka et al. | 400/9 |
| 5,404,432 | 4/1995 | Koopman et al. | 395/144 |
| 5,410,647 | 4/1995 | Peaslee et al. | 395/150 |
| 5,416,898 | 5/1995 | Opstad et al. | 395/168 |
| 5,432,890 | 7/1995 | Watanabe | 395/781 |
| 5,501,538 | 3/1996 | Sawada et al. | 400/304 |
| 5,566,276 | 10/1996 | Muraishi | 395/110 |
| 5,572,234 | 11/1996 | Dohnal | 345/132 |

OTHER PUBLICATIONS

"Adobe Type 1 Font Format", Adobe Systems, Inc., Mar. 1990, pp. 1–101.

Primary Examiner—Heather R. Herndon
Assistant Examiner—Stephen Hong
Attorney, Agent, or Firm—Jones & Askew, LLP

[57] ABSTRACT

A method of controlling the intercharacter spacing between adjacent characters in automatic typography systems. The method ensures that the autohinter creates even spacing between two adjacent characters as the resolution and font size varies. The left and right sidebearings of each character are hinted to one of a plurality of numbers of pixels to produce a hinted left sidebearing and a hinted right sidebearing. Next, a predetermined number of pixels are subtracted from one of the hinted sidebearings and added to the other of the hinted sidebearings. At font sizes less than a predetermined threshold, the plurality of numbers of pixels are such that the left and right sidebearings are hinted to a nearest integer plus one-half pixel, and at all font sizes greater than the predetermined threshold, the left and right sidebearings are hinted to a nearest integer.

11 Claims, 12 Drawing Sheets

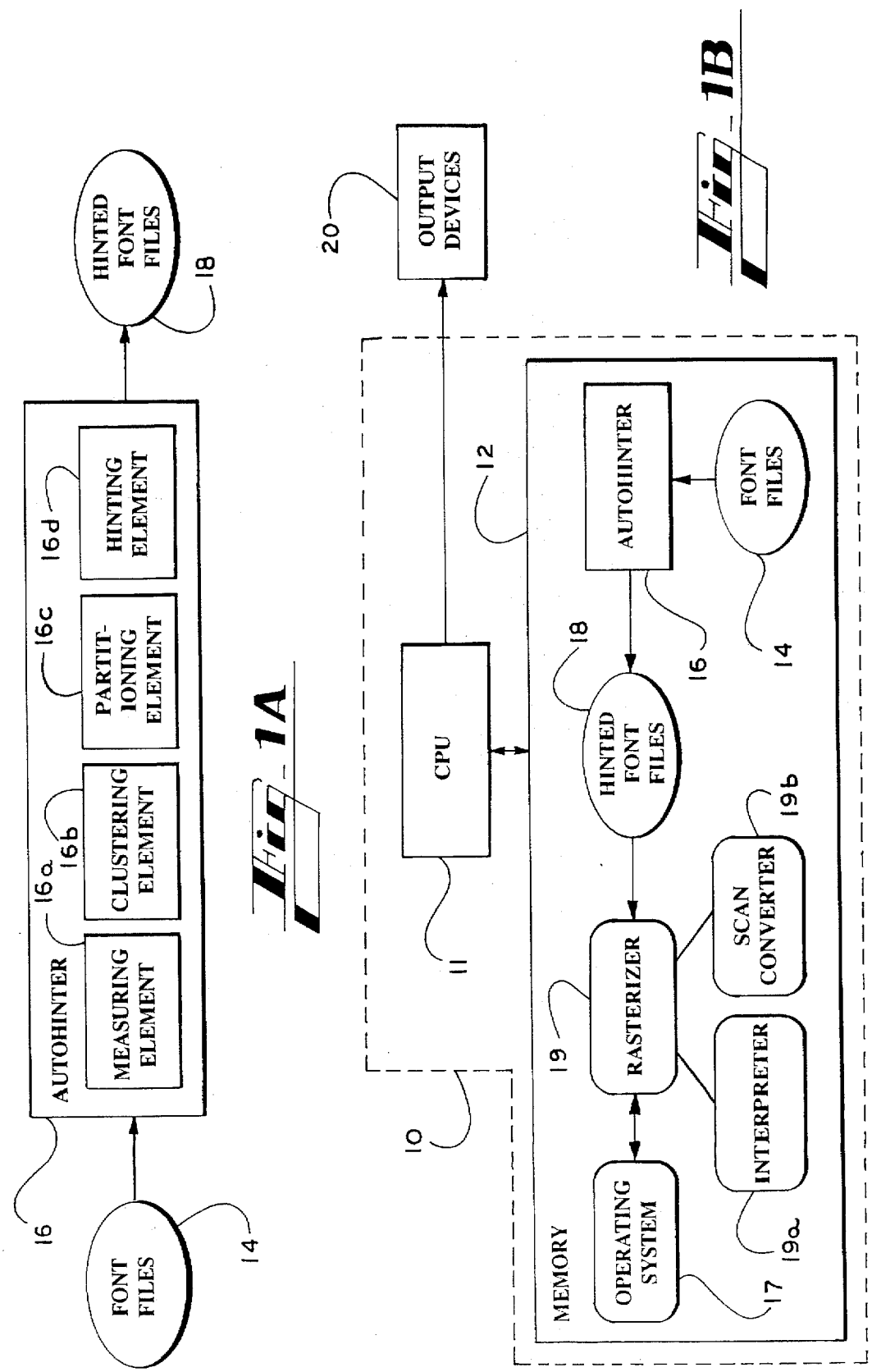

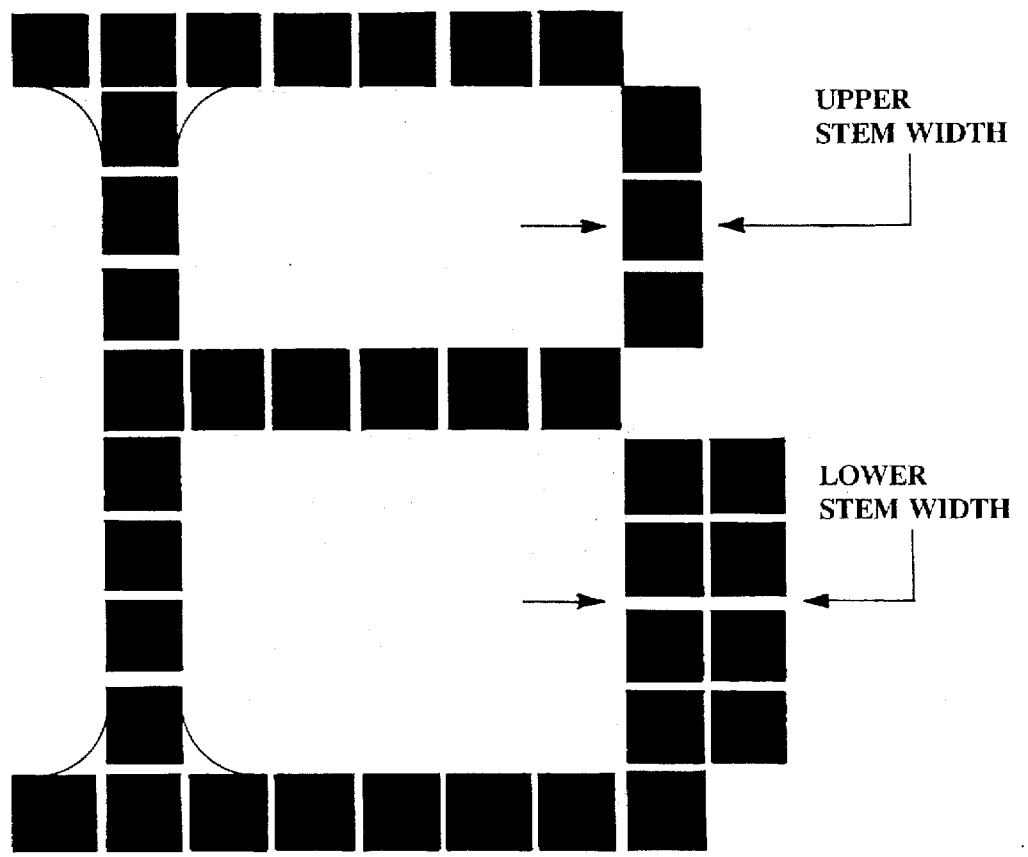
 = 1 PIXEL (ACTIVATED)
Fig_2

| Stem Width (em units) | Weight |
|---|---|
| 30 | 10 |
| 31 | 19 |
| 33 | 21 |
| 38 | 9 |
| 45 | 12 |
| 54 | 7 |
| 67 | 26 |
| 71 | 8 |
| 74 | 18 |
| 81 | 24 |
| 85 | 15 |
| 86 | 13 |
| 100 | 17 |
| 108 | 11 |
| 110 | 25 |
| 114 | 22 |
| 116 | 16 |
| 117 | 6 |
| 120 | 23 |
| 122 | 5 |
| 125 | 14 |
| 128 | 14 |
| 140 | 20 |
| 142 | 4 |
| 144 | 3 |
| 150 | 1 |

FIG. 4A

| Stem Width (em units) | Weight | |
|---|---|---|
| 30 | 10 | |
| 31 | 19 | |
| 33 | 21 | |
| 38 | 9 | |
| 45 | 12 | |
| ~~54~~ | ~~7~~ | |
| $M_1$  67 | 26 | d = 16 |
| ~~71~~ | ~~8~~ | |
| ~~74~~ | ~~18~~ | |
| ~~81~~ | ~~24~~ | |
| 85 | 15 | |
| 86 | 13 | |
| 100 | 17 | |
| 108 | 11 | |
| 110 | 25 | |
| 114 | 22 | |
| 116 | 16 | |
| 117 | 6 | |
| 120 | 23 | |
| 122 | 5 | |
| 125 | 14 | |
| 128 | 14 | |
| 140 | 20 | |
| 142 | 4 | |
| 144 | 3 | |
| 150 | 1 | |

FIG. 4B

| Stem Width (em units) | Weight |
|---|---|
| 30 | 10 |
| 31 | 19 |
| 33 | 21 |
| 38 | 9 |
| 45 | 12 |
| 54 | 7 |
| $M_1$ 67 | 26 |
| 71 | 8 |
| 74 | 10 |
| 81 | 24 |
| 85 | 15 |
| 86 | 13 |
| 100 | 17 |
| 108 | 11 |
| $M_2$ 110 | 25 |
| 114 | 22 |
| 116 | 16 |
| 117 | 6 |
| 120 | 23 |
| 122 | 5 |
| 125 | 14 |
| 128 | 14 |
| 140 | 20 |
| 142 | 4 |
| 144 | 3 |
| 150 | 1 |

| Stem Width (em units) | Weight |
|---|---|
| 30 | 10 |
| 31 | 19 |
| $M_3$ 33 | 21 |
| 38 | 9 |
| 45 | 12 |
| 54 | 7 |
| $M_1$ 67 | 26 |
| 71 | 8 |
| 74 | 10 |
| 81 | 24 |
| 85 | 15 |
| 86 | 13 |
| 100 | 17 |
| 108 | 11 |
| $M_2$ 110 | 25 |
| 114 | 22 |
| 116 | 16 |
| 117 | 6 |
| 120 | 23 |
| 122 | 5 |
| 125 | 14 |
| 128 | 14 |
| 140 | 20 |
| 142 | 4 |
| 144 | 3 |
| 150 | 1 |

| Measurement |
| --- |
| 30 |
| 80 |
| 90 |
| 120 |
| 200 |
| 240 |
| 250 |
| 280 |

FIG. 6A

| Measurement |
| --- |
| 30 |
| 80 |
| 90 |
| 120 |
| 200 |
| 240 |
| R₁ [250] |
| 280 |

FIG. 6B

| Measurement |
| --- |
| 30 |
| 80 |
| 90 |
| — — 120 — — — · S ≤ 440 |
| 200 |
| 240 |
| R₁ [250] |
| 280 |

FIG. 6C

| Measurement |
| --- |
| 30 |
| 80 |
| 90 |
| R₂ [120] — — · S ≤ 440 |
| 200 |
| 240 |
| R₁ [250] |
| 280 |

FIG. 6D

| Measurement |
| --- |
| — — 30 — — — S ≤ 180 |
| 80 |
| 90 |
| R₂ [120] — — · S ≤ 440 |
| 200 |
| 240 |
| R₁ [250] |
| 280 |

FIG. 6E

| Measurement |
| --- |
| R₃ [30] — — S ≤ 180 |
| 80 |
| 90 |
| R₂ [120] — — · S ≤ 440 |
| 200 |
| 240 |
| R₁ [250] |
| 280 |

FIG. 6F

| Measurement |
| --- |
| R₃ [30] — — S ≤ 180 |
| 80 |
| 90 |
| R₂ [120] — — S ≤ 440 |
| R₄ → [200] — — S ≤ 100 |
| 240 |
| R₁ [250] |
| 280 |

FIG. 6G

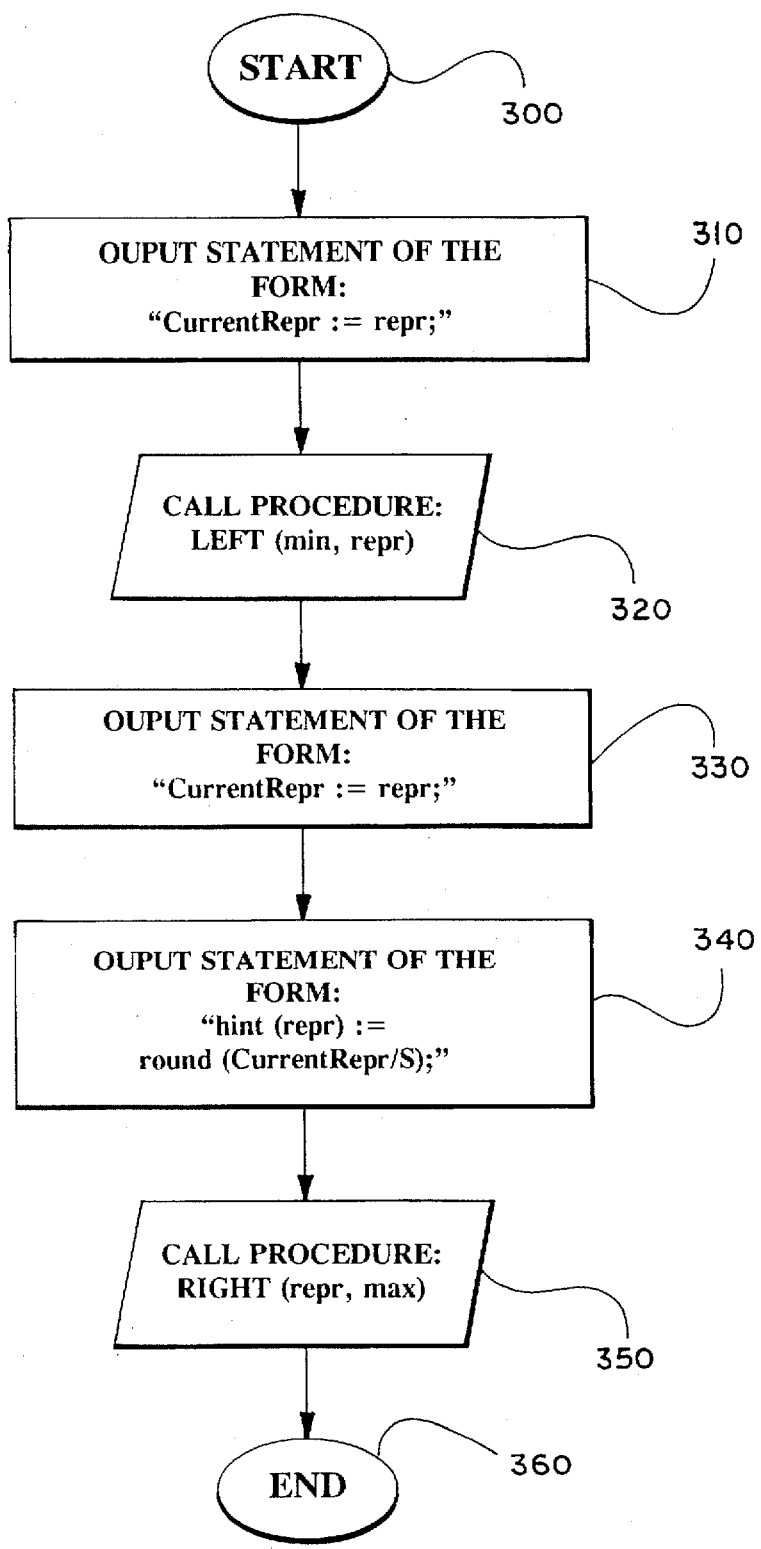
Fig_7

# METHODS AND SYSTEM FOR CONTROLLING INTERCHARACTER SPACING AS FONT SIZE AND RESOLUTION OF OUTPUT DEVICE VARY

This is a division of application Ser. No. 08/311,962, filed Sep. 26, 1994, now U.S. Pat. No. 5,598,520.

TECHNICAL FIELD

This invention relates generally to automatic rendering of computer fonts, and in particular to methods of hinting font outlines that provide improved stem width and intercharacter spacing control for automatic typography systems.

BACKGROUND OF THE INVENTION

As the use of personal computers and high resolution display and printer devices has proliferated over the past decade, the art of rendering and displaying fonts on pixel-oriented display devices has become much more refined. As is well known to those skilled in the art, a "font" is a collection of characters designed in a consistent style. Modern computer systems and applications now routinely support fonts in dozens of different typefaces and in various font sizes in response to the specific needs of users.

To keep pace with the growing demands of users, a specialized form of typography has developed that is devoted solely to the display of computer fonts. Expert font designers, also known as typographers, are responsible for creating aesthetically pleasing font designs. The fonts can be displayed on a wide variety of output devices. A typographer hand designs "outlines" of each character of the particular font. Each outline is comprised of a combination of straight lines and curves that form the shape of the character's outlines. A "glyph" refers to the filled outline of a character. Each glyph is composed of "stems", which are the straight or curved strokes. Stem widths are measured in an artificial measurement system called "design units" or "em units".

In order to render the font on a selected output device, the outlines are scaled according to the font size requested by the user and the characteristics of the output device on which it is to be displayed, i.e., its resolution. Thereafter, the outlines may be scan converted to produce a bitmap that can be rendered on the selected output device.

Fonts may by displayed on a wide variety of output devices. The most common output devices include raster scan cathode ray tube (CRT) displays, pixel-oriented LCD displays, dot matrix printers and laser printing devices. The resolution of any particular display device is specified by the number of dots or pixels per inch (dpi) that are to be displayed. For example, a Video Graphics Adapter (VGA) trader OS/2 and "WINDOWS" operating systems is treated as a 96 dpi device, and many laser printers have a resolution of 300 dpi. Some devices, such as an Enhanced Graphics Adapter (EGA), have different resolution in the horizontal and vertical directions (i.e., non-square pixels); in the case of the EGA this resolution is 96×72.

As is well known in the art, a "pixel" is simply a discrete segment of an overall field in which an image can be displayed. In most devices, pixels are square or round in shape, but some pixel-oriented display devices include rectangular pixels. A pixel is either activated or not activated when the process that generates the display determines it is appropriate to activate that portion of the image field.

Users often desire to change the size of text that is displayed on an output device such as a display screen or a printer. Therefore, modem operating systems such as "WINDOWS", developed by Microsoft Corporation, the assignee of the present invention, and the operating system used on the Apple Macintosh computers provide displays that will display text from applications in varying fonts and in various sizes. The selection of character sizes is changed dynamically, and fonts can be changed independently of modifications to the stored text in memory or a disk file controlled by the application.

Because the resolution of output devices as well as the size of the font specified by the user can vary greatly, it is impossible to maintain the exact original font design while actually rendering the fonts on output devices. With very high resolution devices (e.g., a 600 dpi printer) or for large font sizes, it can be relatively easy to render the fonts close to the outline designs. However, as the resolution of the output device decreases and the size of the font becomes smaller, it becomes much more difficult to maintain the original design proportions. This is because the actual number of pixels used to render the font decreases. At low resolutions and/or small font sizes, most stem widths may be only one or two pixels wide. At low resolution/small sizes, however, the difference between a character stem width or an intercharacter space (i.e., the spacing between two adjacent characters) that is one pixel wide and one that is two pixels wide is very noticeable, and the wrong choice will often be distracting and unaesthetic.

As pixel-oriented output devices have achieved higher and higher resolution, it has become possible to display text in smaller and smaller characters on pixel-oriented output devices while still maintaining readability. However, as physical character size gets smaller for an output device of a given resolution, the potential and frequency of sampling errors such as dropout becomes greater.

To assist in the rendering of fonts at low resolution and/or small sizes, typographers typically use what is often referred to as an "autohinter", for example, the TypeMan autohinter, originally developed by Type Solutions, Inc. An "autohinter" is a set of programs that analyze the outlines of fonts and "hint" the fonts according to the size specified by the user and the resolution of the display device. "Hinting" generally refers to the process of making slight alterations to the boundaries of the glyph in order to fit it to pixel boundaries while distorting it as little as possible.

The fundamental task of hinting is to identify the critical characteristics of the original design and use instructions to ensure that those characteristics will be preserved when the glyph or outline is rendered at different sizes on different devices. Common goals include consistent stem weights, consistent color, even spacing, and the elimination of pixel dropouts.

One form of hinting is referred to as "grid fitting". Grid fitting refers to distorting character boundaries so that they lie on integral grid coordinates. The hinting of straight stems normally includes a slight translation of the character within a defined character area and may include widening or narrowing of glyph stems to assure that long straight stems cover an integer number of pixels.

The objective of an autohinter is to produce "hinted" outlines, in which each character has a small associated program called the "glyph program", and the font as a whole has an additional program called the "preprogram". These programs are stored with the font, to be invoked later by the document preparation system. When a user of such a system specifies a desired resolution and size for some text, the preprogram and glyph programs are invoked, and together convert widths measured in design units into widths measured in pixels, those widths being appropriate for the requested resolution and size. The widths measured in pixels are called "hinted" widths. The hinted widths must be a whole number of pixels, since each pixel is an atomic dot on the screen or printed page that is either black or white. Thus, the goal of the autohinter is to output a preprogram and glyph programs that will produce well-coordinated hinted widths, no matter what resolution or size the user later specifies.

There are several general principles of typography that should be followed in hinting stem widths. The most important principle is that at any given resolution and size, the ratio of any two hinted stem widths (measured in pixels) should approximate the ratio of those two stem widths in the original outlines (measured in design units). A particularly important special case of this principle is that at small sizes, two stem widths or intercharacter spaces that are close in the typographer's design should be rendered as equal widths, i.e., hint to an equal number of pixels.

A second important principle is that as the font size requested by the user increases, the hinted width of a given stem should not decrease. This is sometimes referred to as the principle of "monotonicity". A third, closely-related principle is that as the requested font size increases slowly, the hinted width of a given stem should increase smoothly rather than suddenly. For example, a given stem width should not change from two pixels to five pixels when the font size is incremented only slightly. Finally, the stem control system should allow convenient manual intervention by an expert typographer to allow fine tuning of the automatic hinter.

Previous stem control systems, such as Adobe Corporation's Type 1 autohinter, typically operate in the following manner. At small sizes, a small collection (between 1 and 24) of "standard" stem widths (e.g., the stems of 1–24 characters), specified by the font designer, are each scaled and rounded to the nearest pixel. Every other stem is then hinted to the closest standard stem width. At larger sizes, whenever a stem width scales to a value too far from that of any standard stem width, it is scaled and rounded to the nearest pixel, independent of the hinting of other stem widths.

These systems have proven to operate effectively at small sizes (where all stem widths should hint to one pixel according to the first principle of typography discussed above) and at very large sizes (where according to the same principle, each stem width should scale and round independently in order to preserve the proportions in the design). However, it has been found that these systems generally do not adequately preserve the design proportions at intermediate font sizes. For example, at a certain size, two stem widths that are very close in design units may hint to two different numbers of pixels, such as two and three pixels, respectively. This situation could arise if only one of the stem widths is still close enough to a standard stem width, or if one width scales to just below 2.5 pixels and the other scales to just above 2.5 pixels.

Furthermore, for prior stem control systems, the hinted width of a given stem may decrease as the requested font size increases. This is a violation of the second principle of typography discussed above.

Previous stem control systems also fail to provide a mechanism for the intended user, i.e., the typographer or font designer, to fine tune the output of the autohinter. In these systems, typically the only means of manual intervention is to actually change the code in the programs output by the autohinter. Thus, it is not possible for the typographer to control general specifications, for example, to change all sizes in a particular class of characters by a predetermined number of pixels.

Therefore, there is a need for an improved method for controlling stem width and intercharacter spacing that is adapted to make the transition smoothly and gradually from the smallest sizes (where all stem widths should hint to one pixel) to the largest sizes (where each stem width is scaled and rounded independently).

Furthermore, there is a need for an improved stem control system that allows for convenient manual intervention by an expert typographer for fine tuning the output of the autohinter.

SUMMARY OF THE INVENTION

The problems associated with controlling stem width and intercharacter spacing in an automatic typography system are solved by the principles of the present invention. The present invention provides; methods of hinting a font to provide improved stem width and intercharacter spacing control as the font size and the resolution of the output device vary. The methods are adapted to make the transition smoothly and gradually from the smallest font sizes to the largest font sizes. Furthermore, the present invention provides for convenient manual intervention by a typographer or font designer for fine tuning the output of the autohinter.

In one aspect of the present invention, a method of hinting the stem width of a font at any given scaling factor is provided. The scaling factor is a function of the size of the font and the resolution of the output device on which the font is to be rendered. Hinting begins by measuring the stem widths of the font. Next, all stem width measurements within a predetermined cluster tolerance parameter are clustered to produce a plurality of clustered measurements. For any given scaling factor, each of the plurality of clustered measurements is then hinted to an integer number of pixels to produce a hinted outline. The hinted outline may be provided to a scan converter which converts the hinted outline into a bitmap image of the font.

The clustering of the stem width measurements into a plurality of clustered measurements begins by assigning a weight to each stem width measurement. The weight is a function of both the number of occurrences of the stem width measurement and the number of occurrences of the stem width measurements that are within the predetermined cluster tolerance parameter. The stem width measurement with the maximum weight is selected, and all other stem widths within the predetermined cluster tolerance of this measurement are eliminated. The weights of the remaining measurements are adjusted accordingly.

Next, the stem width measurement with the maximum weight among the remaining stem width measurements is selected, and all stem width measurements within the predetermined cluster tolerance of it are eliminated. The process of selecting the measurement with the maximum weight and eliminating the measurements within the cluster tolerance is repeated until no measurements remain. The result of the clustering process is, therefore, a set of clustered measurements.

In another aspect of the invention, the set of clustered measurements is thereafter partitioned into a plurality of contiguous blocks. The number of blocks into which the clustered measurements are divided is a function of the scaling factor. In the partitioning phase, one of the clustered measurements is selected as a representative measurement from each of the blocks. In the preferred embodiment, the representative measurement is the stem width measurement within each block with the highest number of occurrences. Each of the representative measurements is then hinted to an integer number of pixels. Each of the measurements within the same block as the representative measurement is then hinted to the same integer number of pixels.

According to this aspect of the invention, a block is partitioned into two contiguous blocks of measurements when the difference between some measurement in that block and the block's representative scales to a number of pixels above a predetermined threshold. In the preferred embodiment, the predetermined threshold is one half a pixel.

According to another aspect of the invention, a method of controlling the intercharacter spacing between two adjacent characters is described. This method ensures that the autohinter creates even spacing between two adjacent characters as the resolution and font size varies. Each character has a left sidebearing and a right sidebearing, which define the amount of space that the character ideally should have to its left and right, respectively. In general, the clustering and partitioning algorithms described above in connection with stem control are also used to achieve spacing control.

According to this aspect of the invention, at small font sizes the hinting method includes the steps of measuring the left and right sidebearings of each character. Next, the left and right sidebearings are hinted to one of a plurality of numbers of pixels, each of which is an integer plus half a pixel, to produce a hinted left sidebearing and a hinted right sidebearing. Finally, a predetermined number of pixels, such as one half a pixel, is subtracted from the left sidebearing, and one half pixel is added to the right sidebearing. In effect, one half a pixel is borrowed from the left sidebearing and added to the right sidebearing. Alternatively, the one half a pixel may be borrowed from each right sidebearing and added to the corresponding left sidebearings. This method ensures that the intercharacter spacing between two adjacent characters will be rendered correctly and consistently, regardless of the font size specified by the user or the resolution of the output device.

According to yet another aspect of the invention, an autohinter for hinting the stem widths of a font is described. The autohinter comprises a measuring element, a clustering element, a partitioning element, and a hinting element. The measuring element measures the stem widths of the font to produce stem width measurements. The clustering element clusters all of the stem width measurements within a predetermined cluster tolerance parameter into a plurality of clustered measurements. For any given scaling factor, the partitioning element partitions the plurality of clustered measurements into a plurality of contiguous blocks. The hinting element hints each of the plurality of clustered measurements to one of a plurality of integer numbers of pixels to supply a hinted width for each stem.

Therefore, it is an object of the present invention to provide an improved method of controlling the stem width of fonts that is adapted to make the transition smoothly and gradually from the smallest sizes to the largest sizes.

It is another object of the present invention to provide an improved method of controlling intercharacter spacing between adjacent characters that is adapted to make the transition smoothly and gradually from the smallest sizes to the largest sizes.

It is another object of the present invention to provide an improved method of stem control and intercharacter spacing that ensures that, at any given resolution and font size, the ratio of any two hinted stem widths approximates the ratio of those two stem widths in the original outlines.

It is a further object of the present invention to provide an improved method of stem control and intercharacter spacing that ensures that as the font size increases, the hinted stem width does not decrease.

It is a further object of the present invention to provide an improved method of stem control and intercharacter spacing that ensures that as the requested font size increases slowly, the hinted width of a given stem increases smoothly.

It is another object of the present invention to provide an improved method of stem control and intercharacter spacing that allows for convenient manual intervention by expert typographers for fine tuning the output of the autohinter.

These and other objects, features and advantages of the present invention may be more clearly understood and appreciated from a review of the following detailed description and by reference to the appended drawings and claims.

BRIEF DESCRIPTION OF THE DRAWINGS

FIGS. 1A-B are block diagrams of the preferred operating environment for the preferred embodiment of the present invention.

FIG. 2 illustrates an upper case letter B with two vertical curved stem widths that have been hinted independently.

FIGS. 4A-D are tables of stem widths and weights that together illustrate the clustering process.

FIGS. 6A-G are groups of clustered measurements that together illustrate the partitioning process.

FIG. 7 is a flow chart illustrating the linear algorithm used for hinting stem width measurements in the preferred embodiment of the present invention.

DETAILED DESCRIPTION

Figure 3:
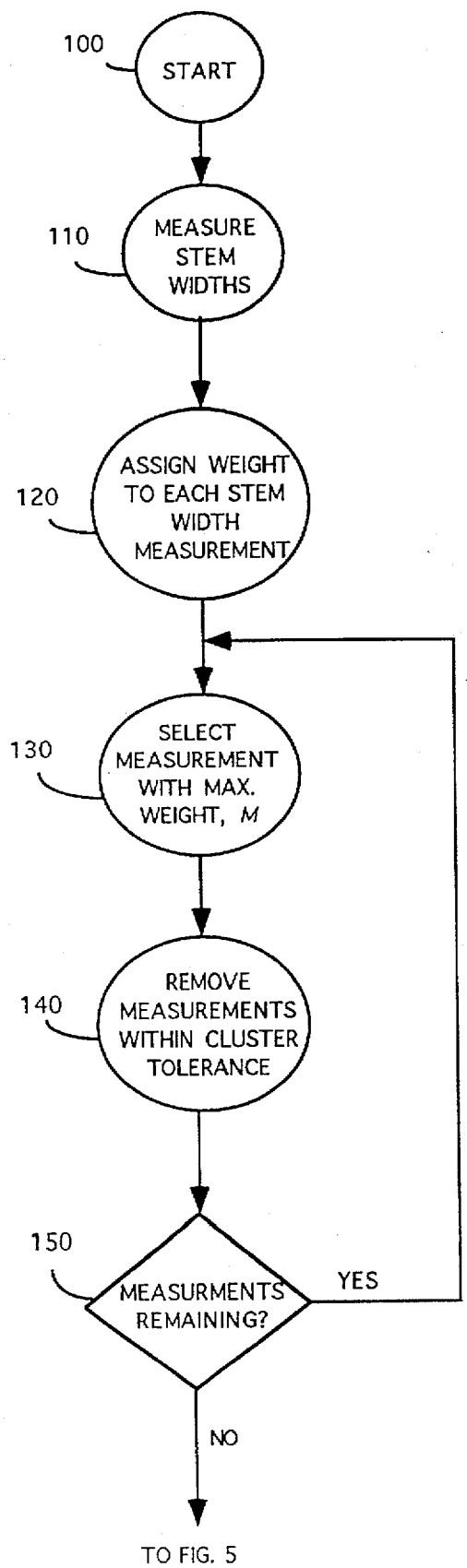
FIG. 3 is a flow chart illustrating the clustering of stem width measurements.

The present invention is directed to an improved autohinter that automatically hints the character outlines and intercharacter spacing of a font in order to make its appearance close to the original font design. The autohinter is designed to make the transition smoothly and gradually from the smallest sizes and resolutions (where all stem widths and intercharacter spaces hint to one pixel) to the largest sizes and resolutions (where each stem width and intercharacter space is scaled and rounded independently). The autohinter thus provides improved stem width control and intercharacter spacing control over a wide range of resolutions and font sizes. Furthermore, unlike prior stem control systems, the autohinter of the present invention provides for convenient manual intervention by a typographer or font designer for fine tuning the output of the autohinter.

FIGS. 1A–B illustrate block diagrams of the preferred operating environment for the preferred embodiment of the present invention. The present invention is based upon computer-implemented processes that can be embodied in one or more programs for a data processing system, such as the computer system 10 shown in FIG. 1B, to carry out the methods and functions described herein. These computer-implemented processes operate upon electrical or other physical signals to generate the desired physical results.

Turning now to FIG. 1A, each font file 14 contains a description of the geometric characteristics of the characters within a character set associated with a selected font. The font flies 14 may also store hinting instructions if provided by the font designer. In one embodiment, the font files 14 are in the TrueType font format, which is well known in the art. The font files 14 are provided to the autohinter 16, which hints the character outline by executing a set of routines that adjust the shape of the character outline for the requested font size and resolution to fit the appropriate boundaries of the pixel grid. The operation of the autohinter 16 in hinting the character outlines will be described in detail below. The autohinter 16 operates as a separate or offline process from the process of displaying text-based characters as shown in FIG. 1B.

In general, the autohinter 16 comprises four elements: a measuring element 16a, a clustering element 16b, a partitioning element 16c, and a hinting element 16d. The measuring element 16a measures the stem widths of the character outline of the font that is provided by the font file 14. The clustering element 16b clusters all stem width measurements into a plurality of clustered measurements. For any given scaling factor, the partitioning element 16c partitions the clustered measurements into a plurality of contiguous blocks. The hinting element 16d hints each of the clustered measurements to one of a plurality of integer numbers of pixels to supply a hinted width for each stem, which is then stored in a hinted font file 18.

Thus, the output of the autohinter 16 is a hinted font file 18, in which each character has a small associated program called the "glyph program", and the font as a whole has a collection of programs called the "font program" and an additional program called the "preprogram". These programs are stored with the font, to be invoked later by a rasterizer, as will be described in detail below.

FIG. 1B illustrates a computer system 10 which operates on the output of the autohinter 16 to support the display of text-based characters by connected output devices 20. The computer system 10 includes a central processing unit (CPU) 11 which operates to execute stored programs desired by an operator of the system. The computer system 10 runs the autohinter 16, an operating system 17 and rasterizer 19. The rasterizer 19 includes an interpreter 19a and a scan converter 19b. The font files 14, autohinter 16, operating system 17, hinted font files 18, and rasterizer 19 can be stored within a memory 12. The memory 12, which is connected to the CPU 11 via a bi-directional signal path, may be implemented as volatile memory, such as random access memory (RAM), or nonvolatile memory, such as a fixed disk drive, or a combination of both memory types. Although it is not shown in the drawing, it will be appreciated that a disk drive may also be connected to the CPU 11 so that data, such as the hinted font files 18, can be transferred back and forth between the disk drive and the memory 12.

The computer 10 in one embodiment is an Apple Macintosh from Apple Computer, Corporation, with Motorola 680x0 microprocessors. To simplify the representation of a general purpose computer system, conventional computer components, including computer resources such as direct memory access controller, interrupt controller, and IO controllers, are not shown. However, it will be appreciated that the CPU 11 is connected to conventional computer components via one or more system busses that support communications of control, address, and data signals between the CPU 11 and these standard computer components. It should also be appreciated that the font file 14 and autohinter 16 could reside in a separate computer system which would generate the hinted font file 18. The hinted font file could then be transferred to the computer system including the rasterizer. For ease of description, the autohinter and rasterizer and the font files are illustrated in a single computer system.

As requested by the operating system 17 or an application program (not shown) running on the computer system 10, the rasterizer 19 invokes the preprogram and glyph programs generated by the autohinter of the present invention and stored with the hinted font file 18. An operating system or application program will invoke the rasterizer when the font to be displayed is modified and therefore requires a new bitmap. The interpreter 19a reads the font description of the character outline supplied by the desired hinted font file 18. In addition, the interpreter 19a receives information to support the scaling of the character outline, including the point size of the character to be displayed and the predetermined resolution of the selected output device 20. The interpreter 19a then executes the programs stored with the hinted font file 18 to convert stem widths measured in design units into widths measured in pixels that are appropriate for the requested resolution and size.

After the character outlines are hinted by the programs produced by the autohinter 16, the outlines are scan converted by the scan converter 19b in a conventional manner to produce a bitmap image that can be rendered on the selected output device 20. Output devices 20 may include raster displays, printers or any other pixel-oriented display devices. The character bitmaps produced by the scan converter 19b define the pixels to be activated for displaying images of the characters on the selected output device 20.

Figure 5:
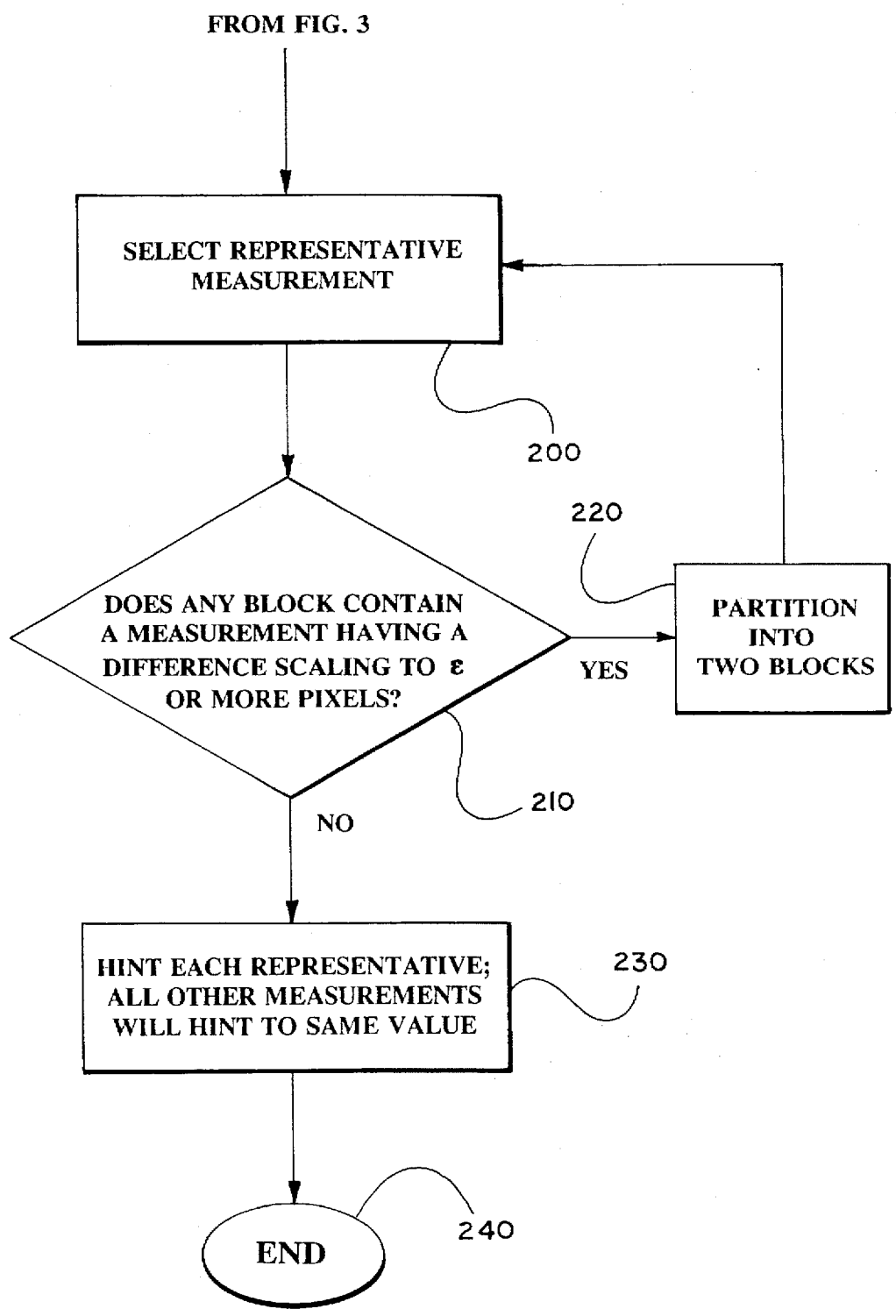
FIG. 5 is a flow chart of a simplified representation of the partitioning of clustered measurements into contiguous blocks.
Figure 8:
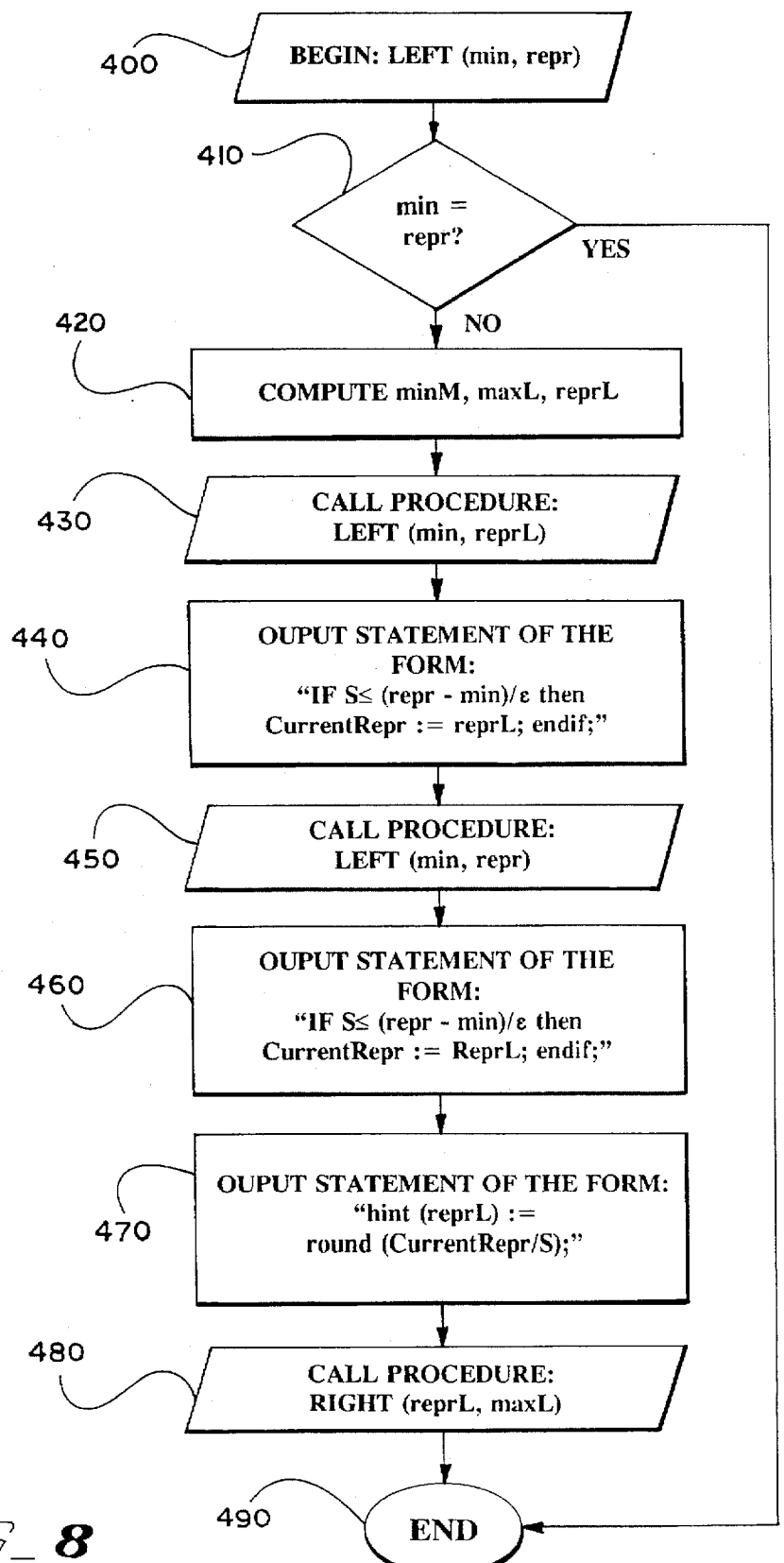
FIG. 8 is a flow chart illustrating the definition of the recursive procedure Left used in the linear algorithm shown in FIGS. 7 and 9.
Figure 9:
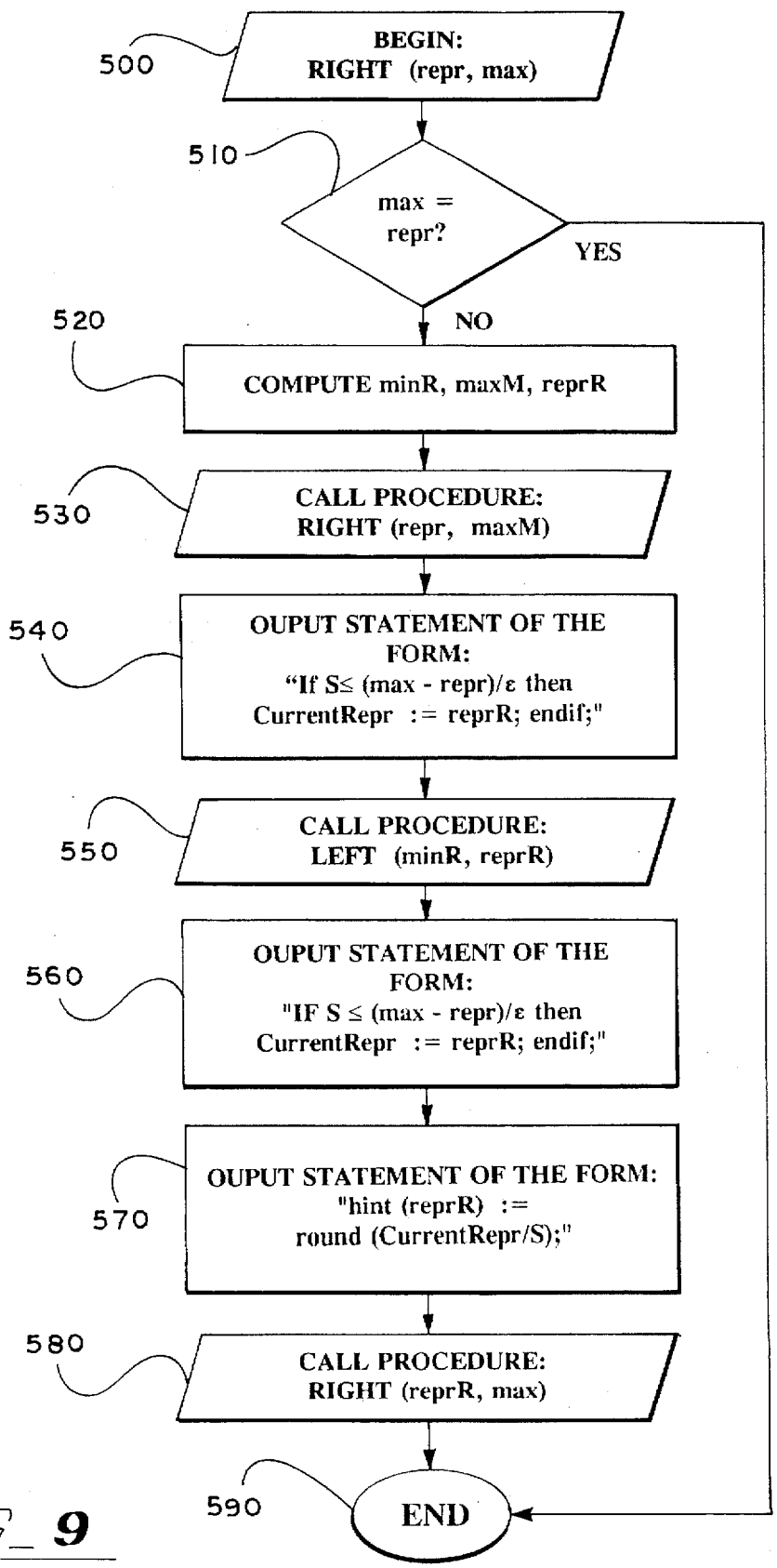
FIG. 9 is a flow chart illustrating the definition of the recursive procedure Right used in the linear algorithm shown in FIGS. 7 and 8.

With that preface, the operation of the autohinter 16 will now be described in detail. In general, the autohinter 16 in the preferred embodiment hints character outlines by measuring the stem widths of the font, clustering the stem width measurements, partitioning the clustered measurements into contiguous blocks, and then hinting the clustered measurements to one of a plurality of integer numbers of pixels to supply a hinted width of the stem. FIGS. 3 and 4 together illustrate the clustering phase, while FIGS. 5 and 6 provide a simplified representation of the partitioning phase. Finally, FIGS. 7–9 illustrate a preferred implementation of the method of the present invention.

It is well known that the use of pixel-oriented display devices to display features of continuous smooth curves can lead to visual distortion because of the discrete nature of the pixels and their geometry. A pixel is simply a discrete image, usually square or round in shape, that is either activated or not activated to display a portion of an image. For example, when a thin straight line is to be displayed diagonally across the screen of a horizontally scanned raster scan pixel display device, the edges will exhibit an undesirable stair step characteristic. This visual distortion is introduced into the image inherently by the process of sampling the original curve and deciding which pixels should be activated.

Prior stem control systems also contribute to visual distortions in the display of features on pixel-oriented display devices. These rudimentary systems simply hint each stem width independently, which can cause undesirable distortions in the rendered image as demonstrated in FIG. 2.

FIG. 2 illustrates an upper case letter B with two stem widths that have been hinted independently. Each discrete block in FIG. 2 represents a single pixel that has been activated. By way of example, the upper curved stem width of the letter B will be considered to be 202 design units, and the lower curved stem width is 228 design units. According to the principles of typography discussed above, these two stem widths, because they are close in the original design, should hint to an equal number of pixels.

At certain scaling factors, however, prior stem control systems that merely hint each stem width independently will hint the upper stem width of the letter B to a different number of pixels than the lower stem width. The "scaling factor" is a parameter set by the user and is a function of the resolution of the output device and the font size. The scaling factor is measured in design units per pixel. Thus, for a scaling factor of 140 design units per pixel, a conventional stem control system would scale the upper stem width to 202/140=1.44 pixels, which rounds to 1 pixel, and would scale the lower stem width to 228/140=1.63 pixels, which would round to 2 pixels. The extra pixel on the lower curved stem width as shown in FIG. 2 would likely appear as an undesirable blotch when the character is printed.

The present invention provides a solution to these problems by clustering the measured stem widths and then partitioning the clustered measurements into contiguous blocks. Thereafter, the hinted character outline may be scan converted by a rasterizer to produce a bitmap image that can be rendered on a selected output device.

Referring to FIG. 3, a flow chart illustrating the clustering phase is presented. It will be appreciated that the sequence of steps illustrated in FIG. 3 may be embodied as programs for the autohinter 16 shown in FIG. 1A. The operational flow begins at the START block 100. At step 110, the measuring element 16a of the autohinter 16 (as shown in FIG. 1A) measures the stem widths on various features of the character or glyph in a conventional manner. As is well known to those skilled in the art, the stem width measurements are made by the "feature analysis phase" of the autohinter. The analysis of stem widths in this manner includes using certain points on each character outline from which the stem widths are measured. The stem width measurements are made in design units, which is an artificial measurement system unrelated to the number of pixels.

At step 120, the clustering element 16b of the autohinter 16 (as shown in FIG. 1A) assigns a weight to each stem width measurement. In the simplest case, the weight for each stem width measurement may be equal to the number of occurrences of that measurement, or its "frequency count". However, the preferred embodiment contemplates a more refined linear function that produces better stem control. Rather than simply making the weight of a stem width measurement to be equal to its frequency count, the weight in the preferred embodiment is a function of both the number of occurrences of that stem width and the number of occurrences of each measurement within a distance d of the stem width, where d is a global parameter called the "stem cluster tolerance" and is measured in design units. The stem cluster tolerance is independent of the resolution of the device which will be used to render the fonts.

In the preferred embodiment, there are three cluster tolerance values chosen: stem cluster tolerance, sidebearing cluster tolerance, and general cluster tolerance for all other features. Through experimentation, it has been determined that the preferred values for these are 8 design units for the stem and sidebearing cluster tolerances and 10 for the general cluster tolerance. However, because small variations may be desirable, the preferred embodiment allows the cluster tolerance to be manually changed by the typographer.

Each stem width m has an associated weight, which is a function of $freq(m-d+1)$, $freq(m-d+2)$ ..., $freq(m+d-1)$, where d is the stem cluster tolerance parameter measured in design units, and freq (m) denotes the number of stems in the font that have width m. In the preferred embodiment, the weight of a stem width measurement m is defined as:

$$weight(m) = \Sigma_{m-d < i < m+d}(d-|m-i|)\,freq(i).$$

where m is a stem width measured in design units.

At step 130 the measurement M with the maximum weight is selected as the first measurement. At step 140, all measurements within the stem cluster tolerance, i.e., from $M-d+1$ to $M+d-1$ are then removed (i.e., their freq(i) values are changed to 0), and the remaining weights are recalculated and adjusted accordingly. At step 150, it is determined whether any stem width measurements remain. If there are measurements remaining, then the process repeats beginning with step 130 by selecting the measurement with the maximum weight among those remaining. The process of selecting the measurement with the maximum weight and removing all measurements within the stem cluster tolerance is repeated until no measurements remain. When there are no measurements remaining, the clustering phase is completed, resulting in a set of clustered measurements. The clustered measurements are provided to the partitioning phase, as will be described in detail below.

It has been found that the clustering of stem width measurements as described herein provides at least three distinct advantages. First, clustering allows for the correction of small errors in the autohinter's measurements. Second, because the number of actual stem width measurements can be large (in the thousands for large fonts), clustering cuts down on the number of distinct measurements that are passed on to the partitioning phase, thereby increasing that phase's efficiency. Third, because the partitioning phase, as described in detail below, makes use of the frequency count of each measurement, the clustering phase increases the statistical significance of those frequencies.

An illustrative example of the clustering phase is shown in FIGS. 4A–D, which present partial tables of stem widths with corresponding weights in design units. FIG. 4A is a partial table showing a hypothetical list of stem width measurements in design units and their corresponding weights. Those skilled in the art will recognize that the number of stem width measurements will actually be much larger, however, a smaller number of measurements is presented for ease of illustration.

The clustering phase begins by selecting the stem width measurement, $M_1$, with the maximum weight. Referring to FIG. 4B, the measurement 67 design units has the maximum weight, and is therefore selected as the first clustered measurement. This is illustrated in FIG. 4B by the encircling of the measurement 67 and its corresponding weight 26.

The next step in the clustering process is co remove all measurements within the stem cluster tolerance d of the selected measurement. In the example shown in FIGS. 4A–D, the stem cluster tolerance d is chosen to be 16 design units. Therefore, all measurements between $M_1-(d-1)$ (67−(16−1)=52) to $M_1+(d-1)$ (67+(16−1)=82) design units are removed. This is illustrated in FIG. 4B by the striking through of the measurements 54, 71, 74, and 81. For ease of illustration, FIGS. 4A–D assume that the remaining weights do not change when these measurements are removed.

Because there are still measurements remaining, the process is repeated by selecting the stem width measurement with the highest weight remaining, $M_2$, and removing all measurements within the stem cluster tolerance. In the FIG. 4C, the measurement with the next highest weight is the measurement 110. This is represented in FIG. 4C by the encircling of the measurement 110 and its corresponding weight 25. Next, all measurements between $M_2$–(d–1) (110–(16–1)=95) and $M_2$+(d–1) (110+(16–1)=125) design units are removed. This is illustrated in FIG. 4C by the striking through of the measurements between 95 and 125 design units.

Because there are still measurements remaining, the process is repeated a third time as shown in FIG. 4D. Of the measurements remaining, the stem width 33 has the maximum weight, $M_3$. Therefore, FIG. 4D shows stem width 33 encircled to illustrate that it has been selected as the next clustered measurement. Next, all measurements within the stem cluster tolerance d of the selected measurements are removed. Therefore, all measurements between M3–(d–1) (33–(16–1)=18) and $M_3$+(d–1) (33+15=48) are removed, illustrated by the striking through of all stem width measurements between 18 and 48 design units.

For ease of illustration, FIGS. 4A–D do not illustrate any further repetitions of the clustering process. However, it will be readily apparent to those skilled in the art that the clustering procedure of selecting the measurement with the maximum weight and removing its neighboring measurements is repeated until no measurements remain. The results of the clustering process are therefore a set of clustered measurements, $M_1$, $M_2$, $M_3$ . . . . For two consecutive clustered measurements $M_i$ and $M_j$, the boundary between their clusters is defined to occur at the average $(M_i+M_j)/2$.

Given a particular scaling factor, the partitioning element 16c of the autohinter 16 (as shown in FIG. 1A) next partitions the clustered measurements into contiguous blocks, each of which has a designated representative measurement. The purpose of partitioning is to divide the set of clustered measurements into blocks within each of which the measurements will hint equally. In other words, all of the stem widths falling within one block should hint to the same number of pixels when rendered on the particular display device at a particular size.

The number of blocks into which the set of clustered measurements is partitioned is a function of the scaling factor at which the glyph will be rendered, i.e., the number of design units per pixel. At the smallest sizes, all measurements belong to the same block. As the size increases, the partition of measurements is gradually refined into a plurality of contiguous blocks. Ultimately, at a sufficiently large font size, each clustered measurement is in a block by itself and thus is its own representative, which means each measurement scales and rounds independently, as desired.

As the font size increases, the partitioning process requires the setting of two important parameters: when to partition an existing block into two blocks, and where to partition the block. In general, a block should be partitioned into two blocks when the representative measurement no longer reasonably represents the stem width measurement within the block that is the greatest distance away from the representative measurement. In the preferred embodiment, this criterion is satisfied by partitioning a block when the difference between some measurement m and its representative r scales to $\epsilon$ or more pixels, where $\epsilon$ is preferably equal to one-half. However, it will be understood and appreciated to those skilled in the art to which this invention pertains that this parameter $\epsilon$ could be set to other values according to the preferences of the users.

In the preferred embodiment, a block is partitioned at the average of the measurement m and its representative r, i.e., (m+r)/2, and the new block containing the measurement m is assigned a new representative. It will be readily apparent to those skilled in the art, however, that a block may be partitioned at any other location between the measurement m and its representative r. Furthermore, those skilled in the art will recognize that the parameter of where to partition an existing block may be determined independently from the parameter of when to partition the block.

FIG. 5 is a flow chart illustrating a simplified implementation of the partitioning phase, including the selection of representative measurements. It will be appreciated that the sequence of steps illustrated in FIG. 5 may be embodied as the partitioning element 16c. Further, it should be understood that the partitioning phase illustrated in FIG. 5 is presented for a fixed scaling factor and operates on each set of clustered measurements provided by the clustering phase illustrated in FIG. 3.

The operational flow begins at step 200 when a "representative measurement" is selected from the set of clustered measurements. In the preferred embodiment, the representative measurement is always taken to be the most frequently occurring stem width of the set of clustered measurements, where the frequency of a measurement m is understood to mean the sum of freq (i) for all measurements i in m's cluster.

At step 210, it is determined whether any block contains a measurement having a difference from its representative measurement scaling to $\epsilon$ or more pixels. If so, then at step 220 the block is partitioned into two blocks. In the preferred embodiment, the block is partitioned at the average of the representative measurement and the measurement within the block that is the greatest distance away. The partitioning phase then continues beginning at step 200, at which a new representative measurement is chosen from the new block of measurements.

The partitioning of the clustered measurements into contiguous blocks continues until, at step 210, no block contains a measurement having a difference from its representative measurement scaling to $\epsilon$ or more, pixels. At a given scaling factor, the hinting element 16d of the autohinter 16 (as shown in FIG. 1A) hints the representative measurement of each block at step 230 by scaling and rounding to the nearest pixel. In general, every other stem width measurement within that contiguous block is hinted to the same value, subject to possible forced monotonicity, as will be discussed below. The partitioning phase is completed at step 240.

The inventors of the present system have found that there may be certain instances in which the partitioning phase discussed above may violate the principle of "monotonicity" discussed above in the Background of the Invention, i.e., as the requested font size increases, the hinted width of a given stem should not decrease. By way of illustration, the set of clustered measurements shown in FIG. 6A will be considered. At very small sizes, the stem width measurement 80 design units may have as its representative the measurement 250 design units as shown in FIG. 6B. As the font size increases, however, the partitioning of the clustered measurements may result in the measurement 120 becoming 80's representative as shown in FIG. 6D. If the measurement 120 hints to a smaller number of pixels than does 250 at this size, the monotonicity principle will be violated.

Therefore, the preferred embodiment of the present invention provides for forced monotonicity. That is, when any stem width measurement is given a new representative that is lower than its old representative, the invention will force the new representative to scale and round to the same value that the old representative scaled and rounded to before the split. The forced monotonicity is continued until the size is large enough so that the new representative itself would scale and round to that number of pixels.

FIGS. 6A–G illustrate an example of the partitioning phase for the hypothetical set of clustered measurements shown in FIG. 6A as the scaling factor S varies. In this example, the measurement 250 design units is assumed to be the most frequently occurring stem width of the set and is therefore chosen as the first representative measurement, $R_1$, as indicated by the box drawn around 250 in FIG. 6B. In the preferred embodiment, the block is partitioned whenever the difference between some measurement m (generally the stem width measurement that is the greatest distance away from the representative) and its representative r scales to more than $\epsilon$ pixels, where $\epsilon$ is preferably equal to one-half. In FIG. 6B, the measurement that is the farthest away is 30 design units. Thus the block is partitioned when the "scaling factor" S goes below 440 design units per pixel ((250−30)/S>0.5).

In the preferred embodiment, the block is partitioned at the average of the representative measurement and the measurement within the block that is the greatest distance away. Therefore, in the illustrated example, the block would be partitioned at the average of 250 and 30, or 140 design units. The partitioning of the clustered measurements is indicated in FIG. 6C by the dotted line between the measurements 120 and 200.

A new representative is chosen from the new block by determining which is the most frequently occurring measurement in that block. In the example shown in FIG. 6D, the measurement 120 is assumed to be the most frequently occurring measurement in the new block and is therefore chosen as its representative measurement, $R_2$ (indicated by the box drawn around 120 in FIG. 6D).

As the font size increases, the partition is gradually refined. The measurement 30 is the measurement within either block that is the greatest distance from its representative measurement. Therefore, the block will be partitioned at the average of 120 and 30, or 75 design units. This is illustrated by the dotted line between 30 and 80 shown in FIG. 6E. Likewise, the block would be partitioned when the scaling factor S goes below 180 design units per pixel ((120−30)/S>0.5 pixels).

In FIG. 6F, since the measurement 30 is the only measurement within its block, it will necessarily be its own representative, $R_3$. The refining of the partition continues as the font size continues to increase. The measurement 200 is now at the greatest distance from its representative, so the next division will occur as illustrated in FIG. 6G.

For a given number of design units per pixel (scaling factor S), the partitioning process is repeated until no block contains a measurement whose difference from its representative scales to $\epsilon$ or more pixels. At this point, each block representative r is scaled by the scaling factor and rounded to the nearest integer h. All measured stem widths within r's block are hinted to the value h, which will yield the appropriate number of pixels when that stem is rendered. The refinement of the partitions is used to produce a smooth transition from low resolution/small size (where every measurement hints to one value) to high resolution/large size (where every measurement scales and rounds independently).

It should be recalled that one output of the autohinter is a program called the "preprogram" that is stored with the font, to be invoked later by the rasterizer. Therefore, output statements of the autohinter produce instructions that are appended to the preprogram. A naive implementation of the partitioning phase as described above leads to a preprogram whose size is proportional to $n^2$, where n is the number of clustered measurements. In this implementation, there would be n cases, one for each time the partition is refined. For each of these n cases, there would be n hinting statements of the form:

hint(m):=round(representative(m)/S);

where hint (m) is the hinted value of measurement m as output by the preprogram, representative (m) is the representative of m in the current partition, and S is the current scaling factor, measured in design units per pixel.

It has been found that the implementation of the partitioning phase as described above may be inefficient. Therefore, in the preferred embodiment, the implementation of the partitioning phase outputs a preprogram whose size is proportional to n instead of $n^2$. This is accomplished by using recursion and changing the order in which measurements are hinted.

Figure 10:
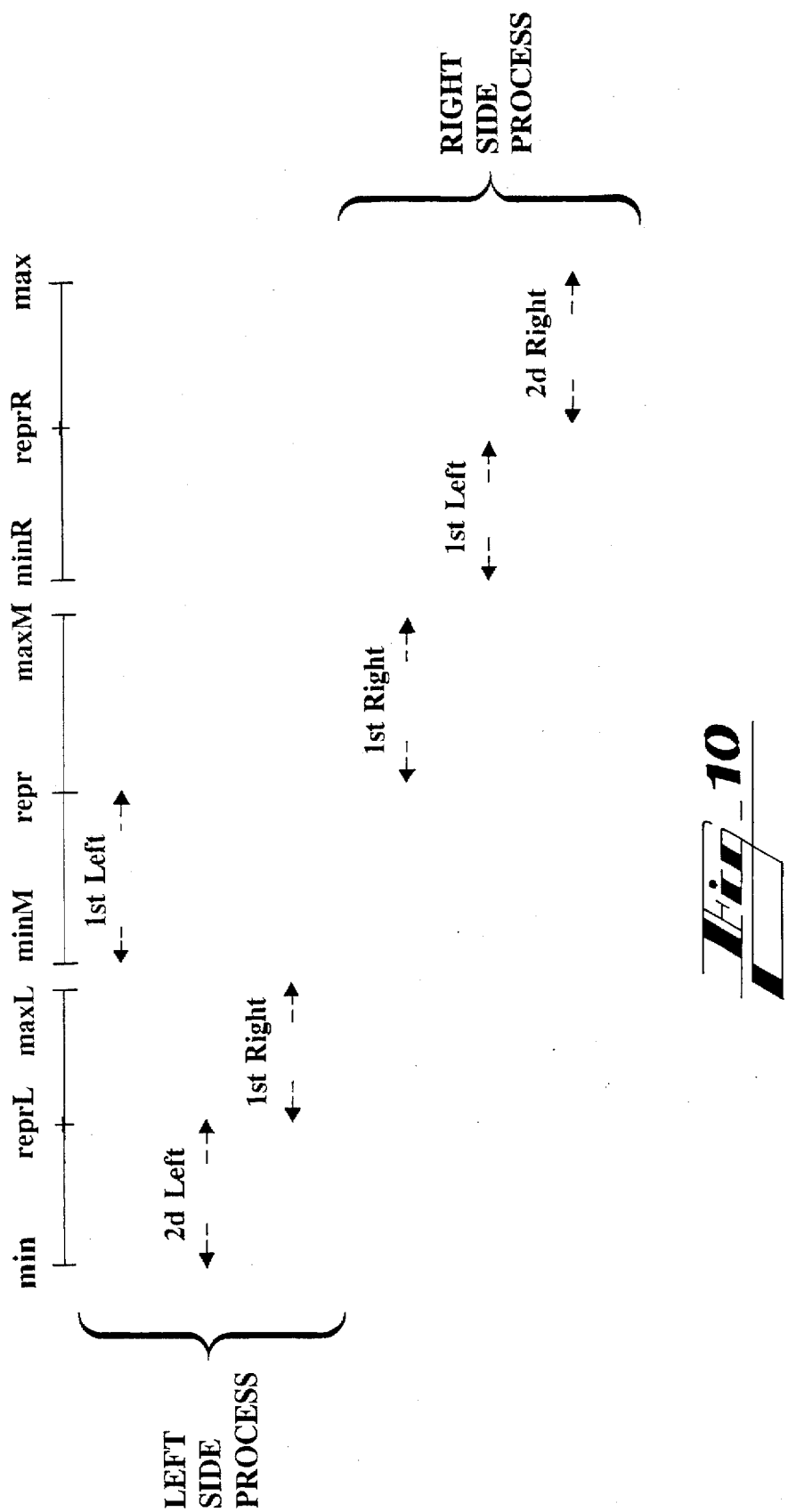
FIG. 10 is a schematic representation of the variables used in the linear algorithms shown in FIGS. 7-9.

FIG. 7 is a flow chart illustrating the preferred linear algorithm used to hint all measurements at a given scaling factor S. The output statements of the autohinter shown in the linear algorithm produce instructions that are appended to the preprogram which is stored with the font. In FIG. 7, min, repr, and max are the minimum, representative, and maximum, respectively, of all the stem width measurements, and CurrentRepr is a local variable in the preprogram. Left and Right are the recursive procedures shown in FIGS. 8 and 9, respectively. A schematic representation of the variables used is shown in FIG. 10.

Referring to FIG. 7, the operational flow begins at step 300. At step 310, an output statement of the form "CurrentRepr:=repr;" is appended to the preprogram. When the preprogram is later invoked by the rasterizer, this output statement assigns the local variable CurrentRepr to be the representative of the clustered measurements, repr. In other words, the representative of the clustered measurements is selected. It will be recalled from the discussion above that in the preferred embodiment the representative measurement is always chosen to be the most frequently occurring measurement in the block.

At step 320, the recursive procedure Left is called, with parameters min and repr. The procedure Left hints the stem width measurements in the left half block, i.e., from the minimum stem width measurement, min, to the representative measurement, repr. The procedure Left is shown in FIG. 8 and will be described in detail in the corresponding discussion.

At step 330, an output statement of the form "CurrentRepr:=repr;" is appended to the preprogram, thereby assigning the local variable CurrentRepr to be the representative measurement, repr.

At step 340, an output statement of the form "hint(repr):=round (CurrentRepr/S);" is appended to the preprogram, where S is the current scaling factor. When the preprogram is later invoked by the rasterizer, this output statement causes the representative measurement, repr, to be hinted to the appropriate number of pixels.

At step 350, the recursive procedure Right is called, with parameters repr and max. The procedure Right hints the stem width measurements in the right half block, i.e., from the representative measurement, repr, to the maximum stem width measurement, max. The procedure Right is shown in FIG. 9 and will be described in detail in the corresponding discussion. The linear algorithm ends at step 360.

FIG. 8 is a flow chart illustrating the recursive procedure Left, with parameters min and repr. The procedure Left (min, repr) hints the stem width measurements in the left half block, i.e., from the minimum stem width measurement, min, to the representative measurement, repr.

The operational flow begins at step 400 when the procedure Left is called. At step 410, it is determined whether the minimum stem width measurement, min, is equal to the representative measurement, repr. If min is equal to repr, i.e., min is its own representative, then the procedure ends at step 490.

If, on the other hand, min does not equal to repr, then at step 420 minM, maxL, and reprL are computed, where minM is defined to be the least stem width measurement greater than or equal to the average ((min+repr)/2) of min and repr; maxL is defined to be the greatest stem width measurement less than the average of min and repr; and reprL is defined to be the representative measurement, i.e., the most frequently occurring measurement in the range from min to maxL.

At step 430, the procedure Left then calls itself, with new parameters minM and repr, which hints the stem width measurements in the range from minM to repr. This is indicated in FIG. 10 by the notation "1st Left" shown in the left side process.

At step 440, an output statement of the form "if S<(repr−min)/$\epsilon$ then CurrentRepr:=reprL; endif;" is appended to the preprogram. In other words, the block containing the measurements repr and min will be split into two blocks whenever the font size increases to the point where the difference between repr and min scales to $\epsilon$ pixels or more, where $\epsilon$ is preferably one half. In the preferred embodiment, the block will be split at the average of min and repr.

At step 450, the procedure Left then calls itself again, with new parameters min and reprL, which hints the stem width measurements in the left sub-block of the left side process, i.e., the range from min to reprL. This is indicated in FIG. 10 by the notation "2d Left" shown in the left side process.

At step 460, an output statement of the form "if S<(repr−min)/$\epsilon$ then CurrentRepr:=reprL; endif;" is appended to the preprogram. In other words, the block containing the measurements repr and min will split into two blocks whenever the font size increases to the point where the difference between repr and min scales to $\epsilon$ pixels or more, where $\epsilon$ is preferably one half. In the preferred embodiment, the block will be split at the average of min and repr.

At step 470, an output statement of the form ".hint(reprL):=round(CurrentRepr/S);" is appended to the preprogram. When the preprogram is later invoked by the rasterizer, this output statement causes all stem width measurements in the same block to hint to the same value that the representative of that block hints.

At step 480, the recursive procedure Right is called, with parameters reprL and maxL, which hints the stem width measurements in the right sub-block of the left side process, i.e., in the range from reprL to maxL. This is indicated in FIG. 10 by the notation "1st Right" shown in the left side process. The recursive procedure Right is shown in FIG. 9 and will be described in detail in the corresponding discussion.

At step 490, the procedure Left ends.

FIG. 9 is a flow chart illustrating the recursive procedure Right, with parameters repr and max. The procedure Right (repr, max) hints the stem width measurements in the right half block, i.e., from the representative measurement, repr, to the maximum stem width measurement, max.

The operational flow begins at step 500 when the procedure Right is called. At step 510, it is determined whether the maximum stem width measurement, max, is equal to the representative measurement, repr. If max is equal to repr, i.e., max is its own representative, then the procedure ends at step 590.

If, on the other hand, max does not equal to repr, then at step 520 minR, maxM, and reprR are computed, where minR is defined to be the least stem width measurement greater than or equal to the average of repr and max, i.e., (repr+max)/2; maxM is defined to be the greatest stem width measurement less than the average of repr and max; and reprR is defined to be the representative measurement, i.e., the most frequently occurring measurement, in the range from minR to max.

At step 530, the procedure then calls itself, with new parameters repr and maxM, which hints the stem width measurements in the range from repr to maxM. This is indicated in FIG. 10 by the notation "1st Right" shown in the right side process.

At step 540, an output statement of the form "if S$\leq$(max−repr)/$\epsilon$ then CurrentRepr:=reprR; endif;" is appended to the preprogram. In other words, the block containing the measurements max and repr is split into two blocks whenever the font size increases to the point where the difference between max and repr scales to a pixels or more, where $\epsilon$ is preferably one half.

At step 550, the procedure Right then calls the procedure Left, with parameters minR and reprR, which hints the stem width measurements in the left sub-block of the right side process, i.e., in the range from minR to reprR. This is indicated in FIG. 10 by the notation "1st Left" shown in the right side process. The recursive procedure Left is shown in FIG. 8, and was described above in the corresponding discussion.

At step 560, an output statement of the form "if S$\leq$(max−repr)/$\epsilon$ then CurrentRepr:=reprR; endif;" is appended to the preprogram. In other words, the block containing the measurements max and repr is split into two blocks whenever the font size increases to the point where the difference between max and repr scales to $\epsilon$ pixels or more, where $\epsilon$ is preferably one half.

At step 570, an output statement of the form "hint(reprR):=round(CurrentRepr/S);" is appended to the preprogram. When the preprogram is later invoked by the rasterizer, this output statement causes all stem width measurements in the same block to hint to the same value that the representative of that block hints.

At step 580, the procedure Right then calls itself again, with new parameters reprR and max, which hints the stem width measurements in the right sub-block of the right side process, i.e., in the range from reprR to max. This is indicated in FIG. 10 by the notation "2d Right" shown in the right side process.

At step 590, the procedure Right ends.

The description of the algorithm shown in FIGS. 7 and 8 ignores the monotonicity principle discussed above. Therefore, the preferred embodiment enforces monotonicity by replacing each hinting statement of the form:

hint(r):=round(CurrentRepr/S);

with one of the form:

him(r):=max(h, round(CurrentRepr/S));

where h is the number of pixels to which the representative R of r hinted at the size at which r's representative changed from R to CurrentRepr.

The specific implementation of the partitioning process used in the preferred embodiment provides a number of improvements to the efficiency of the autohinter. First, it greatly reduces the mount of space required to store the preprogram with the font, as well as the amount of time it takes to run the autohinter. It has also been found that the implementation in the preferred embodiment improves the manageability of the preprogram.

Another factor that must be considered in implementing the stem control system is distortion. The distortion of a measurement m is defined as the difference (measured in pixels) between m's hinted value, and m's scaled value if there were no clustering or partitioning. This can also be expressed as follows:

distortion $(m) = |hint(m) - m/S|$.

At small sizes, some distortion is desirable in order to ensure that the stem widths that are close in the original design hint to an equal number of pixels (according to the first principle of typography, discussed above in the Background of the Invention). However, as the font size increases, excessive distortion can prevent a font from being rendered close to the typographer's original design.

In the algorithm described with regards to the preferred embodiment of the present invention, there are three contributions to the distortion. First, there is a contribution due to the clustering process, which is at most d/S. Second, there is a contribution due to identifying a measurement with its representative in the partitioning process, which is at most $\epsilon$. Third, there is a contribution due to the error introduced by rounding the scaled representative to the nearest integer, which is at most ½. Therefore, the distortion of a measurement m is always less than or equal to $d/S + \epsilon + ½$.

Because the contribution due to the clustering process increases as the size increases (i.e., as the scaling factor S decreases), the algorithm "releases control" above a certain large size T, specified by the user. In other words, above size T each measurement is scaled and rounded independently, with no clustering or partitioning in effect, so that the distortion at these large sizes is at most one-half (due to rounding). The size T is no greater than the size corresponding to the scaling factor $S = d/\epsilon$ design units per pixel, at which size every measurement must be its own representative. Thus, at all sizes the distortion of a measurement m is less than or equal to $2\epsilon + ½$.

While the stem control algorithm disclosed in the preferred embodiment provides numerous improvements over existing stem control systems, it will be well recognized by those skilled in the art that typography is an art, and therefore any automatic hinting system may benefit from fine tuning by a human expert. Therefore, the preferred embodiment provides a number of mechanisms by which an expert typographer can control the autohinter, or fine tune its output. For example, the manual control scheme of the present invention allows the font designer to control general specifications, such as increasing all upper case vertical round stems by one pixel at a given resolution.

In particular, the preferred embodiment allows several parameters to be set by the typographer to control the actual behavior of the autohinter. First, the typographer can specify the cluster tolerance of the clustering algorithm, denoted d in the discussion above. The typographer can also specify the maximum distance in pixels between any measurement and its representative in the partitioning algorithm, denoted a above. The typographer can also select any pair of measurements x and y, and direct the system to delay the splitting of x and y in the partitioning algorithm until a larger size, so as to prevent unfortunate breaks. The typographer can further elect whether vertical and horizontal stems are to be treated together or independently. If they are to be treated together, the typographer can further elect whether vertical stems should take precedence over horizontal stems, and whether the split between the most frequent vertical stem and the most frequent horizontal stem should be accelerated to occur at a smaller size.

For fine tuning the font produced by the autohinter, the present invention allows the typographer to specify, for example, that at certain sizes all stems should be one pixel wider, or that upper case vertical stems should be one pixel narrower or that upper case vertical round stems should be two pixels wider. The method used to accommodate these adjustments is independent of the particular clustering and partitioning algorithms of the preferred embodiment, and could be incorporated as easily into any other hinting algorithms.

An alternative embodiment of the present invention is directed to a method of controlling intercharacter spacing. This method ensures that the autohinter creates even spacing between two adjacent characters as the resolution and font size vary. This method is particularly applicable at low resolution font rendering. In general, the clustering and partitioning algorithms described above in connection with stem control are also used to achieve the intercharacter spacing control.

For each character, the font designer supplies, in addition to the character's outline, left and right "sidebeatings", which are the amount of space the character should have to the left and right, respectively. At larger sizes and higher resolutions, the sidebearings may be clustered and partitioned in the same manner as that used for stem widths, as discussed above. However, it has been found that this method does not work well at small sizes, particularly where it is desirable to have one pixel width between characters. A blind application of the clustering and partitioning algorithms can lead to situations in which the right sidebearing of a character and the left sidebearing of the adjacent character are both one pixel, thereby creating a two pixel wide space between the characters, which is considered too large. In other situations, each of the sidebearings could hint to zero, thereby causing adjacent characters to touch, a clearly acceptable situation. Therefore, the following modifications are made when the scaling factor exceeds a certain threshold. In the preferred embodiment, that threshold is the scaling factor at which the block containing all stem width measurements is first partitioned.

Figure 11:
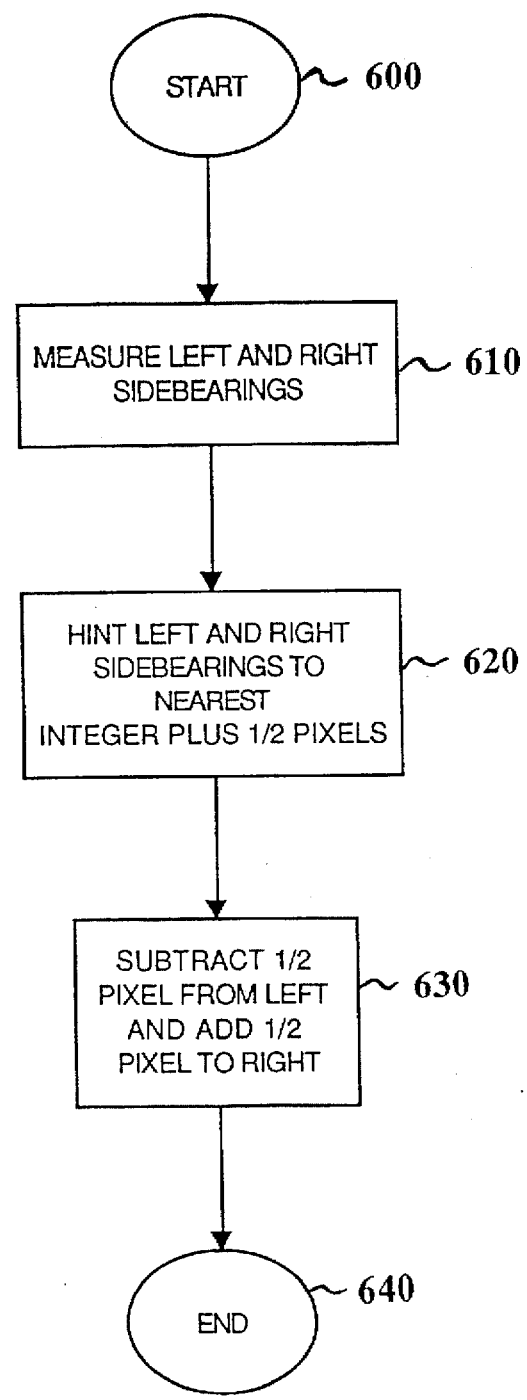
FIG. 11 is a flow chart illustrating an alternative embodiment of the present invention for controlling intercharacter spacing between two adjacent characters.

FIG. 11 is a flow chart illustrating an alternative embodiment that provides a solution to this problem by controlling the intercharacter spacing at low resolution and small sizes. The operational flow begins at the START block 600. At step 610, the left and right sidebearings of each character are measured. At step 620, the left and right sidebearings are hinted to the nearest integer plus one half a pixel, using the hinting methods discussed above for stem widths. Thus, the possible values for the hinted sidebearings are the sequence 0.5, 1.5, 2.5, . . . .

Next, at step 630 one half pixel of distance is subtracted from each left sidebearing and added to the corresponding right sidebearing, and the process ends at step 640. In effect, one half a pixel is borrowed form the left sidebearing and added to the right sidebearing. Alternatively, the one half a pixel may be borrowed from the right sidebearing and added to the left sidebearing provided that this is applied consistently to all characters.

This embodiment allows the left sidebearing to become zero and establishes one pixel as the minimum right sidebearing. At small sizes, this effectively eliminates the problem of small sidebearings causing two pixels of space between adjacent characters. It also eliminates the possibility of having two adjacent characters touching because of zero sidebearings. At larger sizes, all sidebearings are hinted to the nearest integer and no borrowing is performed. This is equivalent to borrowing zero pixels from one sidebearing and transferring them to the other sidebearing.

For example, consider two characters such as H and O that have equal left and right sidebearings, for example 75 design units for O and 233 design units for H. If the user specifies a scaling factor of 100 design units per pixel, the sidebearings of O would each scale to 0.75 pixels, which rounds to 0.5 pixels. The sidebearings of H each scale to 2.33 pixels, which rounds to 2.5 pixels. After shifting half a pixel from each left sidebearing to the corresponding right sidebearing, O has final hinted left and right sidebearings of 0 and 1 pixels, respectively, and H has hinted left and right sidebearings of 2 and 3 pixels, respectively. The result is that the space between the two characters HO (3+0 pixels) will equal the space between the transposition OH (1+2 pixels). The same result will be achieved at any scaling factor specified by the user.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing discussion.

What is claimed is:

1. In an automatic typography system, a method of controlling the intercharacter spacing between adjacent characters, each of said characters having a left sidebearing and a right sidebearing, said method comprising the steps of:

hinting each of said left and right sidebearings of said each character to one of a plurality of numbers of pixels to produce a hinted left sidebearing and a hinted right sidebearing; and subtracting a predetermined number of pixels from one of said hinted sidebearings and adding said predetermined number of pixels to the other of said hinted sidebearings to make said one of said hinted sidebearings a first integral number of pixels and said other of said hinted sidebearings a second integral number of pixels.

2. The method of claim 1, wherein at font sizes less than a predetermined threshold, said plurality of numbers of pixels are such that said left and right sidebearings are hinted to a nearest integer plus one-half pixel, and at all font sizes greater than said predetermined threshold said left and right sidebearings are hinted to a nearest integer.

3. The method of claim 2, wherein at said font sizes less than a predetermined threshold, said predetermined number of pixels is one half pixel, and at said all font sizes greater than said predetermined threshold said predetermined number of pixels is zero.

4. The method of claim 1, wherein said predetermined number of pixels is one-half pixel.

5. An autohinter for controlling intercharacter spacing between adjacent characters, each of said characters having a left sidebearing and a right sidebearing, comprising:

a hinting element for hinting said left and right sidebearings of said each said character to one of a plurality of numbers of pixels to produce a hinted left sidebearing and a hinted right sidebearing; and an adjusting element for subtracting a predetermined number of pixels from one of said hinted sidebearings and adding said predetermined number of pixels to the other of said hinted sidebearings to make said one of said hinted sidebearings a fast integral number of pixels and said other of said hinted sidebearings a second integral number of pixels.

6. The autohinter of claim 5, wherein at font sizes less than a predetermined threshold, said plurality of numbers of pixels are such that said left and right sidebearing are hinted to a nearest integer plus one half pixel, and at all larger font sizes said left and right sidebearings are hinted to a nearest integer.

7. The autohinter of claim 6, wherein at font sizes less than said predetermined threshold, said predetermined number of pixels is one half pixel, and at all larger sizes said predetermined number of pixels is zero.

8. A computer-readable medium on which is stored a program module for controlling the intercharacter spacing between adjacent characters, each character having a left sidebearing and a right sidebearing, the program module comprising instructions which, when executed by a computer, perform the steps of:

hinting each of said left and right sidebearings of said each character to one of a plurality of numbers of pixels to produce a hinted left sidebearing and a hinted right sidebearing; and subtracting a predetermined number of pixels from one of said hinted sidebearings and adding said predetermined number of pixels to the other of said hinted sidebearings to make said one of said hinted sidebearings a first integral number of pixels and said other of said hinted sidebearings a second integral number of pixels.

9. The computer-readable medium of claim 8, wherein at font sizes less than a predetermined threshold, said plurality of numbers of pixels are such that said left and right sidebearings are hinted to a nearest integer plus one-half pixel, and at all font sizes greater than said predetermined threshold said left and right sidebearings are hinted to a nearest integer.

10. The computer-readable medium of claim 8, wherein at font sizes less than a predetermined threshold, said predetermined number of pixels is one-half pixel, and at all font sizes greater than said predetermined threshold, said predetermined number of pixels is zero.

11. The computer-readable medium of claim 8, wherein said predetermined number of pixels is one-half pixel.

* * * * *